Jan. 23, 1940.    W. L. EGY    2,188,038
VERNIER MICROSCOPE
Filed Aug. 8, 1939
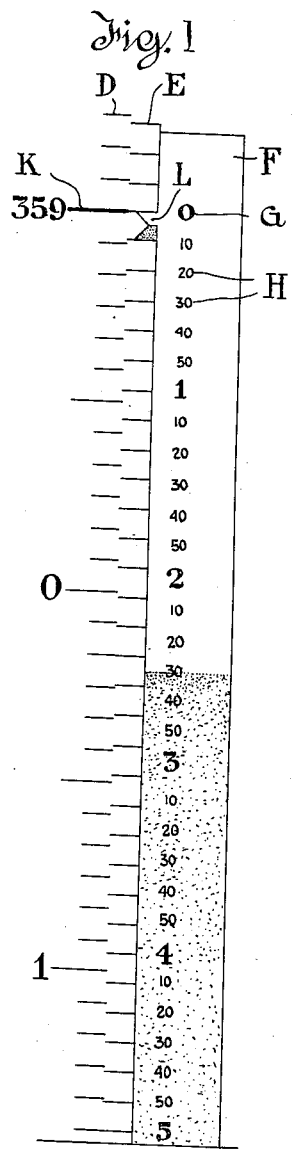
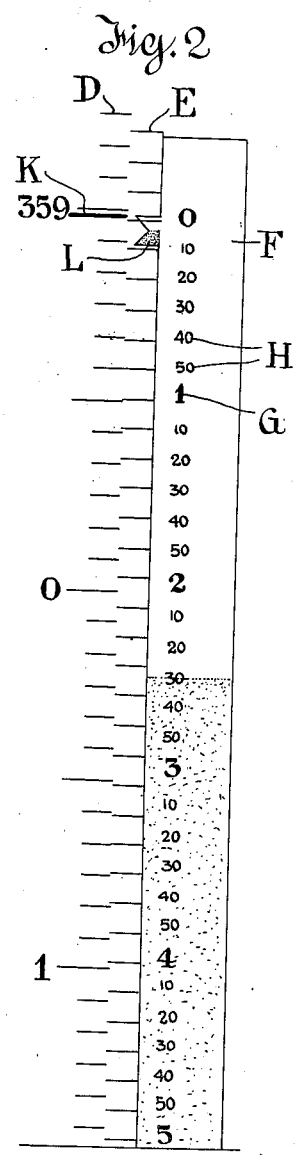
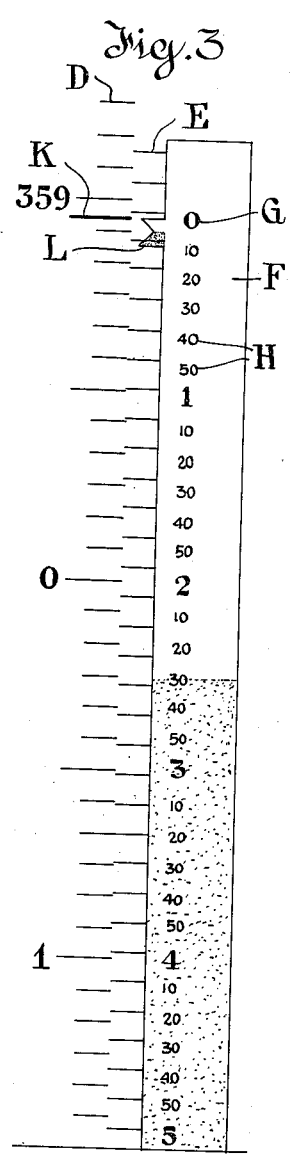
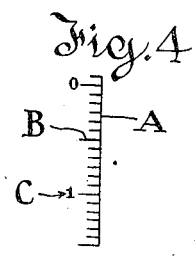
Inventor
Willard L. Egy
Attorneys Patented Jan. 23, 1940

2,188,038

UNITED STATES PATENT OFFICE 2,188,038

VERNIER MICROSCOPE

Willard L. Egy, Troy, N. Y., assignor to W. & L. E. Gurley, Troy, N. Y., a corporation of New York Application August 8, 1939, Serial No. 289,072

4 Claims. (Cl. 88—2.6)

This invention relates to devices for reading optical verniers.

The term "optical verniers" is used to designate the type of vernier described in the patents to Egy, Nos. 1,864,895 and 1,864,896, issued June 28, 1932.

According to the lower numbered patent, above identified, the same scale is read through two magnifying systems of different magnification, one of which is erecting and the other of which is inverting. According to the second patent, two magnifying systems of the same type (preferably both erecting) and of different magnification are used to read diametrically opposite points on a circular graduated limb. In either case, two images of the same graduated scale are secured and a suitable optical system is used to bring the two images into the same focal plane with the edges of the graduated portions in apparent contact so that one may be read against the other as a vernier.

As stated in the second of the Egy patents, the ratio of magnification for the two images is determined as follows: If $n$ represents the denominator of the fraction of the interval to be read, the ratio is $$\frac{n-1}{n+1}$$

Thus, to read tenths, the ratio is 9 to 11. Assuming a scale graduated at 5-minute intervals, to be read to ten seconds, the denominator of the fraction is 30 so that the ratio is 29 to 31, in which case 29 intervals on one image of the scale subtend 31 intervals on the other image of the scale.

The problem of reading a vernier of this type is clearly stated in Patent No. 1,864,896, page 3, commencing with line 55.

When the viewing system and the scale move relatively to each other (and this is true as to the embodiments described in each of the earlier patents), one image appears to move in one direction and the other image appears to move in the opposite direction. The apparent rates of motion are different because the magnifications of the two images are different.

It is for this reason that unusual ratios suggested in the prior patents are used. The optical vernier produces, not a single progressive series of coincidences such as occurs in common verniers, but two series of coincidences, the coincidences in one series occurring alternately with those of the other. One series, the one to be used, starts at one end of the optical vernier and runs serially to the other end. The other series, not to be used, starts at mid-length, runs out at one end, simultaneously comes in at the opposite end and terminates at mid-length. It is this useless or unused series that causes the difficulty in reading such verniers.

In Patent 1,864,896, the proposal is made to use a toothed screen (designated at 54 and shown in Figure 3 of that patent) to blot out the unused or unread coincidences.

While it is technically possible to manufacture such screens, their manufacture in quantity at a reasonable cost has proved to be a difficult problem. On an ordinary horizontal limb of a transit, the graduations are at five-minute intervals. In consequence, the scale of graduations is extremely minute and the production of precise toothed screens giving ten-second intervals which can readily be indicated by the vernier is a matter of decided difficulty.

It will be observed from what is said above that while the useful series of coincidences is progressing through one-half of the vernier, the useless or unused series is progressing through the other half of the vernier.

According to the present invention, use is made of an opaque screen so positioned that the lineal graduations and the numerical indicia of one image are exposed and the lineal graduations of the other image are exposed, but the numerical indicia of such other image are concealed.

Assume a limb graduated in five-minute intervals. There is a primary index to be read against the first image. Since there is a fixed index it may be variously located and supported. It may conveniently be carried by the screen. This gives a direct reading to the nearest 5 minutes. The screen carries numerical indicia properly spaced to be read against the vernier. This provides convenient means for counting the sub-intervals which in the assumed case are 10 seconds with a range of five minutes.

The screen also carries a visual signal, preferably one comprising two areas contrasting in color or otherwise. This signal coacts with a line graduation of one image, and preferably but not necessarily is adjacent the primary index above mentioned. The signal indicates whether the coincidence is to be found in the first half or in the second half of the vernier scale. Preferably, the two halves of the screen corresponding to the two halves of the vernier scale contrast in color or otherwise just as do the two areas of the visual signal. Thus, if the line reads against one area in the signal one reads coincidence against the correspondingly visually distinguished half of the screen. In this way the useful series of coincidences may be read throughout the length of the vernier with ease and certainty.

Adopting Figure 1 of Patent 1,864,895 as a basis for discussion and assuming a scale graduated in degrees with 5-minute sub-divisions, the two optical systems disclosed in the patent project two real images of the same scale differentially magnified on a common focal plane AB (in the patent). This is the plane of the paper of Figures 1, 2 and 3 of the present application and the screen is in this plane and thus corresponds in position but not in form with the screen 28 of Figure 1 of the patent.

In the drawing:

Figure 1 shows the two images and the screen as they would appear when reading 359°—0'—0''.

Figure 2 is a similar view but reading 359°—0'—50''.

Figure 3 is a similar view but reading 359°—3'—20''.

Figure 4 is a fragmentary view on an enlarged scale of the graduated scale or limb which is viewed through the optical system of the Egy patent and which produces the images of Figures 1, 2 and 3.

Referring first to Figure 4, A represents the scale. B represents the graduations thereof which are at 5-minute intervals. C represents the numerical indicia indicating degrees of angle.

Referring now to Figures 1, 2 and 3, D represents the image of the scale of large magnification. E represents the image of the scale of smaller magnification. The numerical indicia in image D are left visible but the image of the numerical indicia of image E are concealed by an opaque screen F. This screen bears large numerals G, indicating minutes through a range of 5-minutes since that is the graduation interval of the scale A. There are smaller numerical indicia H indicating seconds. There is a primary index K which reads against the line graduations of the scale A (or image D thereof). A convenient location for this index is in the focal plane of the images, but in any event it appears to read against the line graduations of the image D.

Extending from the edge of the screen F is a small pennant-shaped signal L. This might coact with either the image D or the image E, but it is simpler to have it coact with the image E and it is so shown.

The over-all extent of the signal L corresponds to the distance that the image with which it coacts will move for 5-minutes of displacement; this refers of course to a case where the graduation interval is 5 minutes. The signal L is divided into two equal parts which are rendered visibly contrasting by any suitable means, for example, by coloring one-half and leaving the other half uncolored.

The screen F is divided transversely into two halves at the 2'—30'' graduation (mid-length). The two halves are uncolored and colored to correspond to the two halves of the signal L. Thus, the signal L can coact with only one line at a time on the scale E. If the line is in the uncolored area of the signal, the appropriate coincidence must occur opposite the uncolored part of the screen F, but if the line is in the colored portion of the signal, then the appropriate coincidence must read opposite the colored part of the screen A.

For example, in Figure 1 the 359° line is a line with the index K and there are no true coincidences on the vernier. The reading is 359°—0'—0''.

In Figure 2, a line on the scale E cuts through the uncolored area of the signal L. Hence, the coincidence to be read on the vernier is opposite the uncolored area of the screen. This occurs at 0'—50'' and since the index K reads between 359°—0' and 359°—5', the reading is 359°—0'—50''.

Figure 3. The index is still between 359°—0' and 359°—5' but the line on image E intersects the colored area of the signal L. Hence, the coincidence to be read will be opposite the correspondingly colored part of the screen F and occurs at 3'—20'' so that the reading is 359°—3'—20''.

A signal has been provided coacting with one of the scales and divided into two halves. This signal, by coaction with the graduation of that scale, indicates which half of the vernier is at that time the useful half. Since the two series of coincidences are always in different halves of the vernier range, the signal offers a ready means for determining which of two coincidences is to be read.

While I prefer to put the signal L close to the primary index K, this obviously is not necessary since the images D and E move at characteristic rates at all points, though the rates for the two images are different. Though different, they have a fixed relationship to each other, so that the position and dimensions of the signal L are readily determinable according to the preferences of the designer.

What is claimed is:

1. Means for reading an optical vernier of the type in which two differentially magnified images of the same line graduated scale appear to move in opposite directions and afford two alternating series of vernier coincidences within the same linear range, comprising screening means associated with said images and coextensive in length with said range, exposing one image and at least the line graduations of the other image; a primary index coacting with the first image; visual means for dividing the screen into two readily distinguishable halves; and a visual indicator coacting with a line graduation of one of said images, and having an extent corresponding with the range of movement of said image as the vernier coincidences pass through said linear range, said indicator being bi-sected and serving to designate the half of said screen in which the vernier coincidence should be read.

2. The combination defined in claim 1 in which the two halves of the screen are visually contrasting and the indicator subtends an interval between successive line graduations of the co-active image and is divided into halves which are similarly contrasting.

3. Means for reading an optical vernier of the type in which two differentially magnified images of the same line-graduated and number-indexed scale appear to move in opposite directions and afford two alternating series of vernier coincidences within the same lineal range, comprising screening means associated with said images and coextensive in length with said range, exposing one image in its entirety and the line graduation of the second image, said screen bearing indicia for identifying vernier coincidences; a primary index coacting with the first image; visual means for dividing the screen transversely with two readily distinguishable halves; and a visual indicator coacting with a line graduation of one of said images, and having an extent corresponding with the range of movement of said image as the vernier coincidences pass through said linear range, said indicator being bi-sected and serving to designate the half of said screen in which the vernier coincidence should be read.

4. Means for reading an optical vernier of the type in which two differentially magnified images of the same line-graduated and number-indexed scale appear to move in opposite directions and afford two alternating series of vernier coincidences within the same lineal range, comprising screening means associated with said images and coextensive in length with said range, exposing one image in its entirety and the line graduations of the second image, said screen bearing indicia for identifying vernier coincidences; a primary index coacting with the first image; visual means for dividing the screen transversely with two readily distinguishable halves; and a visual indicator coacting with a line graduation of the second image, and having an extent corresponding with the range of bovement of said image as the vernier coincidences pass through said linear range, said indicator being bi-sected and serving to designate the half of said screen in which the vernier coincidence should be read.

WILLARD L. EGY.